US008867360B2

(12) United States Patent
Assarpour

(10) Patent No.: US 8,867,360 B2
(45) Date of Patent: Oct. 21, 2014

(54) METHOD AND APPARATUS FOR LOSSLESS BEHAVIOR FOR MULTIPLE PORTS SHARING A BUFFER POOL

(75) Inventor: Hamid Assarpour, Arlington, MA (US)

(73) Assignee: Avaya Inc., Basking Ridge, NJ (US)

( * ) Notice: Subject to any disclaimer, the term of this patent is extended or adjusted under 35 U.S.C. 154(b) by 38 days.

(21) Appl. No.: 13/426,902

(22) Filed: Mar. 22, 2012

(65) Prior Publication Data

US 2013/0250762 A1 Sep. 26, 2013

(51) Int. Cl.
*G08C 15/00* (2006.01)
(52) U.S. Cl.
USPC .......................................... 370/236; 370/230
(58) Field of Classification Search
CPC ..... H04L 1/1835; H04L 1/1874; H04L 12/24; H04L 12/2418; H04L 47/30; H04L 47/722; H04L 49/90; H04L 49/9005; H04L 49/9047; H04L 47/10; H04L 12/5693
USPC .............. 370/229, 230, 230.1, 231, 235, 236, 370/282, 386, 387, 388, 389, 392, 412, 413, 370/429
See application file for complete search history.

(56) References Cited

U.S. PATENT DOCUMENTS

| | | | | |
|---|---|---|---|---|
| 5,905,870 | A * | 5/1999 | Mangin et al. ................. | 709/234 |
| 6,115,356 | A | 9/2000 | Kalkunte et al. | |
| 6,167,054 | A * | 12/2000 | Simmons et al. ............. | 370/422 |
| 7,307,954 | B1 * | 12/2007 | Strandberg et al. ........... | 370/235 |
| 7,372,814 | B1 * | 5/2008 | Chiruvolu et al. ............ | 370/235 |
| 7,636,307 | B2 * | 12/2009 | Thibodeau et al. ........ | 370/230.1 |
| 7,802,028 | B2 | 9/2010 | Andersen et al. | |
| 8,125,967 | B1 * | 2/2012 | Talley et al. .................. | 370/338 |
| 8,208,380 | B1 * | 6/2012 | Nachum et al. ............... | 370/236 |
| 8,467,342 | B2 * | 6/2013 | Loh et al. ...................... | 370/329 |
| 2001/0026539 | A1 * | 10/2001 | Kornprobst et al. .......... | 370/329 |
| 2002/0071398 | A1 * | 6/2002 | Moran et al. .................. | 370/252 |
| 2002/0136163 | A1 * | 9/2002 | Kawakami et al. ........... | 370/229 |
| 2003/0123393 | A1 * | 7/2003 | Feuerstraeter et al. ....... | 370/235 |
| 2003/0231593 | A1 * | 12/2003 | Bauman et al. ............... | 370/235 |
| 2004/0179476 | A1 * | 9/2004 | Kim et al. ..................... | 370/230 |
| 2005/0276219 | A1 * | 12/2005 | Wang et al. ................... | 370/229 |
| 2006/0092837 | A1 | 5/2006 | Kwan et al. | |
| 2006/0092845 | A1 * | 5/2006 | Kwan et al. ................... | 370/235 |
| 2006/0187948 | A1 * | 8/2006 | Yu .................................. | 370/412 |
| 2006/0248242 | A1 * | 11/2006 | Andersen et al. ............... | 710/52 |
| 2007/0030860 | A1 * | 2/2007 | Bekele et al. ................. | 370/468 |
| 2007/0127382 | A1 * | 6/2007 | Hussain et al. ............... | 370/235 |
| 2007/0237074 | A1 * | 10/2007 | Curry ............................ | 370/229 |
| 2008/0259798 | A1 * | 10/2008 | Loh et al. ...................... | 370/235 |
| 2009/0086628 | A1 * | 4/2009 | Gracon et al. ................ | 370/230 |
| 2009/0190605 | A1 | 7/2009 | Andersen | |
| 2010/0014422 | A1 * | 1/2010 | Lee et al. ...................... | 370/230 |
| 2010/0202295 | A1 * | 8/2010 | Smith et al. ................ | 370/235.1 |
| 2010/0322072 | A1 * | 12/2010 | Fujihira et al. ............... | 370/230 |
| 2012/0250501 | A1 * | 10/2012 | Lee .............................. | 370/229 |

* cited by examiner

*Primary Examiner* — Paul H Masur
*Assistant Examiner* — Michael Phillips
(74) *Attorney, Agent, or Firm* — Anderson Gorecki & Rouille LLP

(57) ABSTRACT

Packets are colored and stored in a shared packet buffer without assigning fixed page allocations per port. The packet buffer is divided into three areas—an unrestricted area, an enforced area, and a headroom area. Regardless of the fullness level, when a packet is received it will be stored in the packet buffer. If the fullness level is in the unrestricted area, no flow control messages are generated. If the fullness level is in the enforced region, a probabilistic flow control generation process is used determine if a flow control messages will be generated. If the fullness level is in the headroom area, flow control is automatically generated. Quanta timers are used to control regeneration of flow control messages.

18 Claims, 7 Drawing Sheets

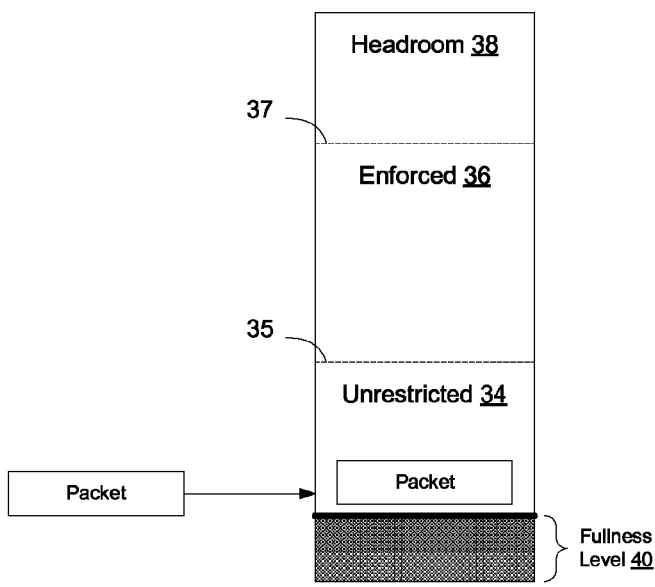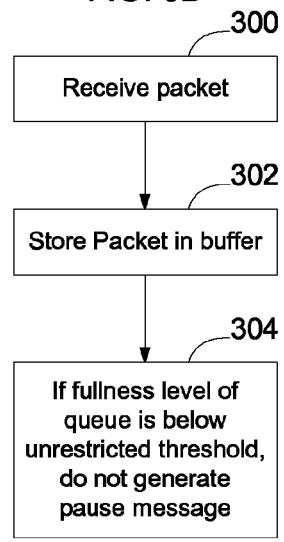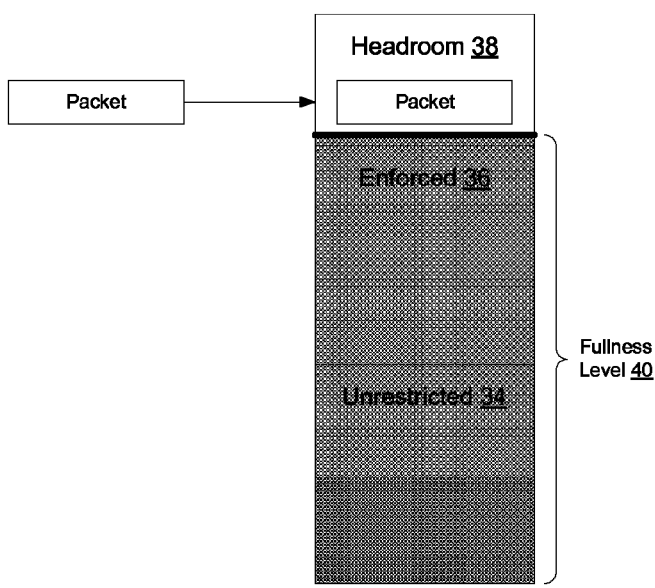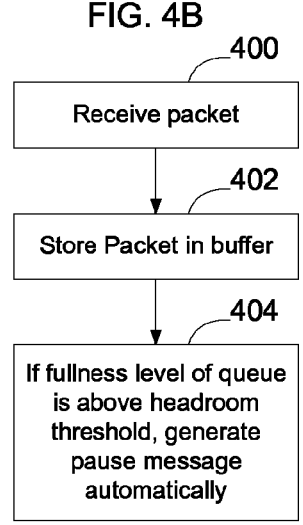

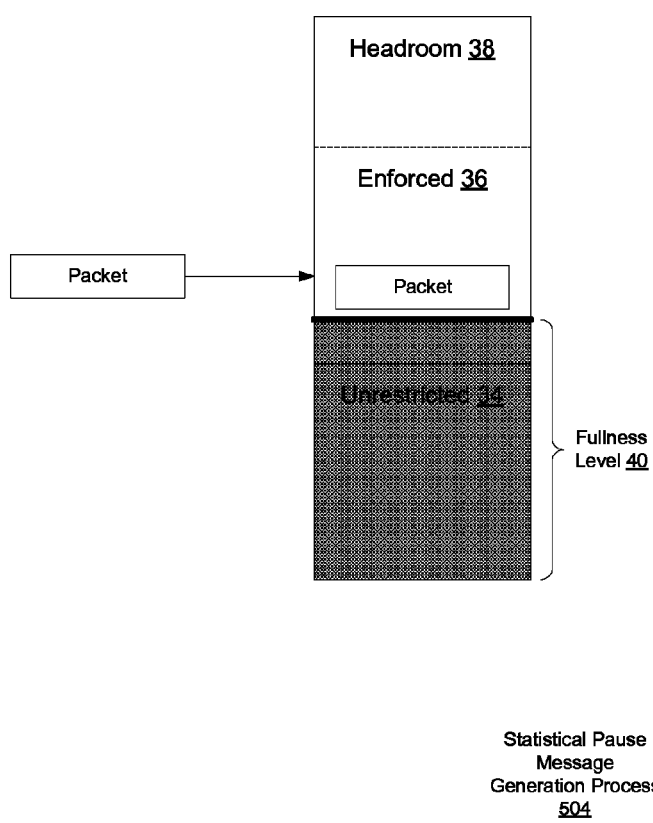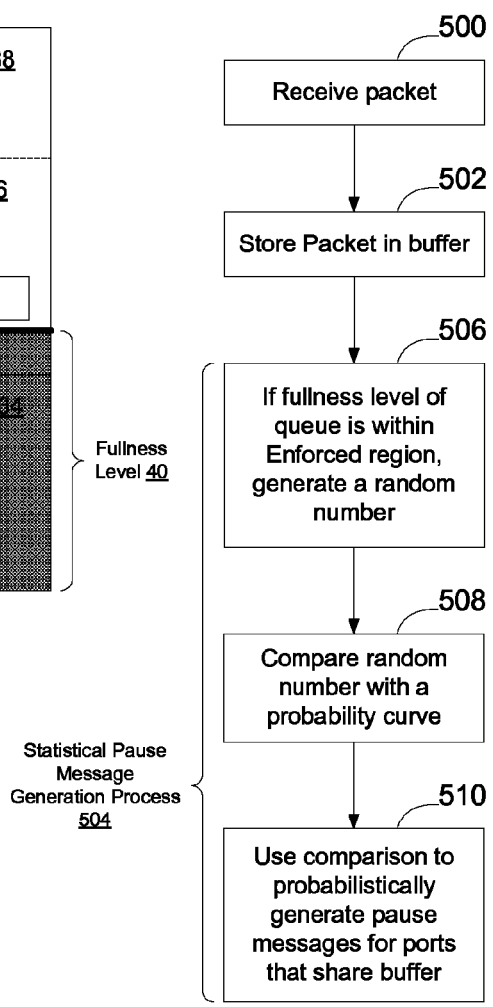

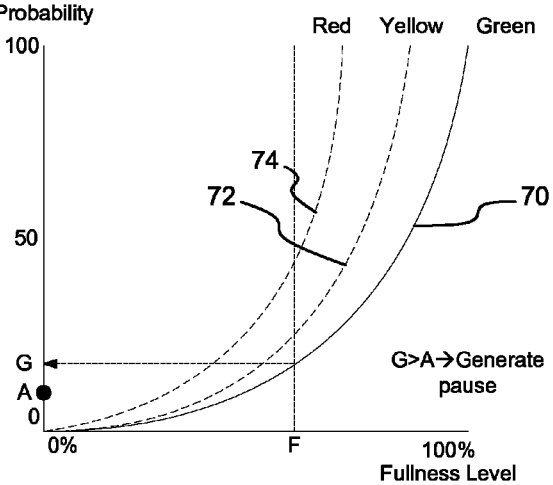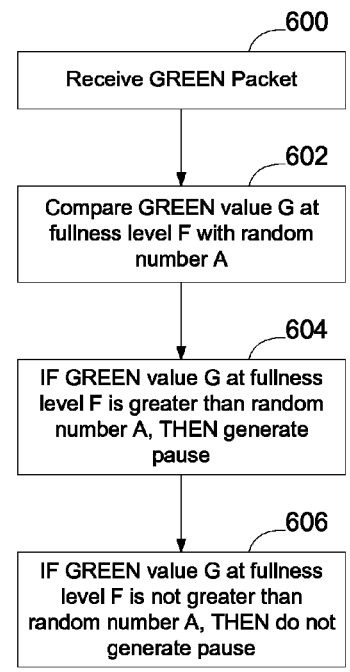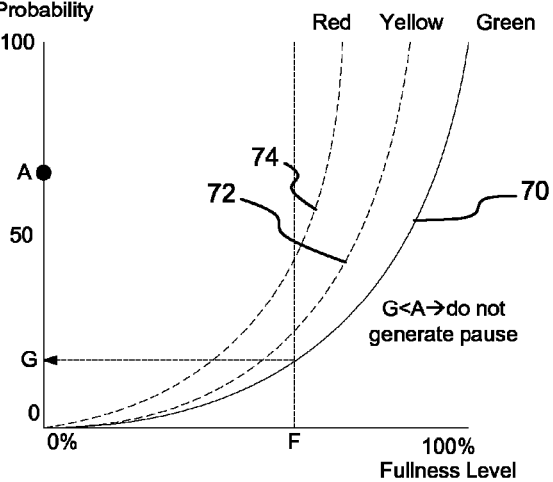

METHOD AND APPARATUS FOR LOSSLESS BEHAVIOR FOR MULTIPLE PORTS SHARING A BUFFER POOL

CROSS-REFERENCE TO RELATED APPLICATIONS

None.

BACKGROUND

1. Field

This application relates to communication networks and, more particularly, to a method for lossless behavior for multiple ports sharing a buffer pool.

2. Description of the Related Art

Data communication networks may include various computers, servers, hubs, switches, nodes, routers, other devices coupled to and configured to pass data to one another. These devices will be referred to herein as "network elements". Data is communicated through the data communication network by passing protocol data units, such as frames, packets, cells, or segments, between the network elements by utilizing one or more communication links. A particular protocol data unit may be handled by multiple network elements and cross multiple communication links as it travels between its source and its destination over the network.

In certain data networks, there may be requirements to deploy switches that provide lossless behavior. This behavior can be either at the port level or at the flow level. In case of a port, any packet entering the switch via a port that is configured as lossless will not be dropped. In case of a flow, any packet entering the switch that is associated with a flow that has been classified as lossless will not be dropped. Other packets in other flows may be dropped, however.

For a switch to maintain lossless behavior, it must have adequate packet buffer capacity and a mechanism that it can use to send pause messages to the offending ingress ports to prevent the ingress ports from overflowing its internal packet buffer. The ingress port will transmit the pause message to cause an upstream network element from transmitting additional packets until the backlog of packets stored in the buffer can be cleared. Pause generation is typically triggered if one or more of the output ports are paused from attached downstream switches, or if multiple ingress ports are sending traffic to lesser numbers of egress ports, thus forming some form of n:1 congestion.

Where the internal packet buffer is shared by a group of ports, the manner in which the buffer pool is managed and the manner in which pause messages are generated is important. Historically each port's usage of the shared buffer pool would be tracked, such that each port received a fixed number of pages of memory in the shared buffer pool. When the amount of memory consumed by a given port reached the allocation threshold, a pause message would be transmitted on the port to instruct the upstream port to cease transmission of additional packets for a period of time. This causes inefficient use of the buffer space when not all ingress ports are active, and can cause excessive pause generation.

Excessive pause generation, in return, can cause output port rate drooping, in which the network element is not able to output packets at full capacity on the output port because of insufficient packets to be transmitted. For example, an input port may cause a pause message to be generated upon receipt of a traffic burst at a port, even if there is sufficient buffer capacity and output capacity on the switch. In addition to causing the output port rate to droop, the premature generation of pause messages may cause head-of line blocking, premature network level congestion spreading, and higher end-to-end latency. Accordingly it would be advantageous to provide a method for lossless behavior for multiple ports sharing a buffer pool.

SUMMARY OF THE DISCLOSURE

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

A method for lossless behavior for multiple ports sharing a buffer pool. Per port color metering is used to meter packets received on each port. The packet buffer is divided into three areas—an unrestricted area, an enforced area, and a headroom area. If a packet is received and the fullness level of the buffer is in the unrestricted area, the packet will be stored in the buffer and no flow control messages are generated. If the fullness level of the buffer is in the enforced region, the packet will be stored in the buffer and a probabilistic flow control generation process is used to cause flow control messages to be generated on a statistical rather than deterministic basis. If the fullness level of the buffer is in the headroom area, the packet will be stored in the buffer and flow control will be generated at the port to cause the upstream nodes to pause sending. In one embodiment a quanta timer having a duration slightly less than a quanta value specified in the flow control message is set whenever a flow control message is set. Non-packet based flow control will be used to reassert flow control if the buffer fullness level is in the headroom area upon expiration of the timer, and packet-based flow control will be used to reassert flow control if the buffer fullness level is in the enforced region at the expiration of the timer.

Those skilled in the art will appreciate the scope of the present invention and realize additional aspects thereof after reading the following detailed description of the preferred embodiments in association with the accompanying figures.

BRIEF DESCRIPTION OF THE DRAWINGS

Aspects of the present invention are pointed out with particularity in the claims. The following drawings disclose one or more embodiments for purposes of illustration only and are not intended to limit the scope of the invention. In the following drawings, like references indicate similar elements. For purposes of clarity, not every element may be labeled in every figure. In the figures:

FIG. 3A graphically illustrates a shared buffer pool at a first fullness level and FIG. 3B is a flow diagram of a process used to selectively generate a pause message based on the fullness level shown in FIG. 3A;

FIG. 4A graphically illustrates a shared buffer pool at a second fullness level and FIG. 4B is a flow diagram of a process used to selectively generate a pause message based on the fullness level shown in FIG. 4A;

FIG. 5A graphically illustrates a shared buffer pool at a third fullness level and FIG. 5B is a flow diagram of a process used to selectively generate a pause message based on the fullness level shown in FIG. 5A;

FIGS. 6A-6C, 7A-7C, and 8A-8C graphically illustrate and provide additional details of the process described in connection with FIGS. 5A and 5B.

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
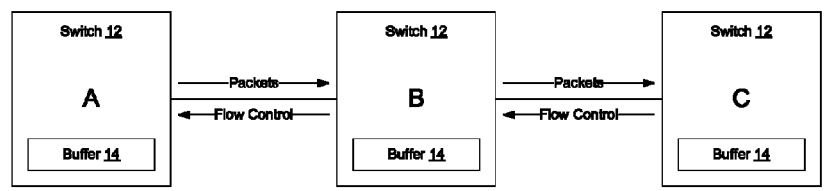
FIG. 1 is a functional block diagram of an example network.

FIG. 1 illustrates an example of a network 10 in which a plurality of switches 12 are interconnected to transmit packets of data. Some of the data may be required to be lossless, meaning that a packet associated with a particular flow or received on a particular port may not be dropped by a switch. In a network of this nature, the switches will transmit flow control messages, referred to herein as pause messages, which enable downstream switches to instruct upstream switches to temporarily stop sending packets of data. For example, switch B transmits packets of data to switch C. If switch C is experiencing congestion or otherwise has a buffer 14 that is approaching a critical fullness level, switch C can transmit a flow control message to switch B to cause switch B to temporarily stop sending packets of data to switch C. If this situation persists for a sufficient period of time, the packet buffer 14 in switch B will likely also fill to a point where switch B will need to assert flow control to switch A to cause switch A to temporarily stop sending packets of data to switch B. When the buffer in switch C is reduced sufficiently, switch C will no longer assert flow control so that switch B can resume transmission of packets to switch C. Flow control will thus cascade up and down through the network as the buffers in the switches fill and empty.

Figure 2:
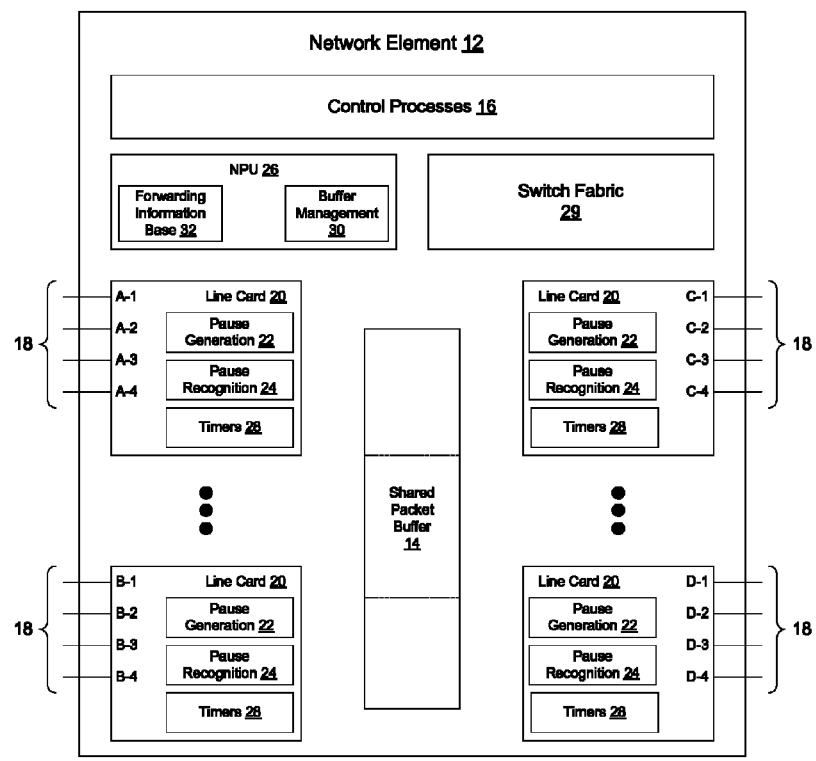
FIG. 2 is a functional block diagram of an example network element.

FIG. 2 shows an example network element 12 that has multiple ports configured to share a common buffer according to an embodiment. Flow control, as described in greater detail below, may be implemented in multiple types of network elements and the process described herein is not limited to the example shown in FIG. 2. Rather, FIG. 2 is merely intended to provide one example of how a network element may be configured to implement the functions described in greater detail below. The network element of FIG. 2 may be used as an edge network element such as an edge router, a core network element such as a router/switch, or as another type of network element. The network element of FIG. 2 may be implemented on a communication network utilizing one of the Ethernet 802.1 standards, such as 802.1 ad, 803.2 ah, 802.1 Qay, 802.1 aq, or other routed Ethernet standard. The network element of FIG. 2 may also be used in other types of wired/wireless communication networks wherever lossless behavior is required.

As shown in FIG. 2, the network element includes one or more control processes 16 to control operation of the network element. Example control processes may include routing processes, network operation administration and management software, an interface creation/management process, and other processes. The particular manner in which the network element is being controlled is not particularly important to understanding operation of the network element on the network and, accordingly, has not been treated in excessive detail herein.

The network element also includes a dataplane configured to handle the rapid transmission of packets of data. The data plane, in the illustrated embodiment, includes ports 18 connected to physical media to receive and transmit data. The physical media may include fiber optic cables or electrical wires. Alternatively, the physical media may be implemented as a wireless communication channel, for example using one of the cellular, 802.11 or 802.16 wireless communication standards. In the illustrated example, ports 18 are supported on line cards 20 to facilitate easy port replacement, although other ways of implementing the ports 18 may be used as well.

The line cards 20 have processing capabilities such as a microprocessor or other hardware configured to format the packets, perform pre-classification of the packets, etc. In one embodiment, the line cards further support pause generation process 22 and pause recognition process 24. The pause generation process 22 will assert flow control on one or more ports of the line card depending on the fullness level of the shared packet buffer 14 as described in greater detail below. The pause generation process may be implemented on a per-port or per-flow basis to assert flow control on a port or within a flow depending on the implementation. The pause recognition process 24 is used to receive flow control messages from other network elements and cause temporary suspension of transmission of packets. Like the pause generation process, the pause recognition process may operate on a per-port or per-flow basis.

Timers 28 are used to allow flow control to be implemented for particular periods of time. In one embodiment, timers 28 are used both by the pause generation process and the pause recognition process. In one embodiment, a flow control message will include a quantum value specifying an amount of time which the upstream node should refrain from transmitting packets. The timer is commonly referred to as a quanta timer. As described in greater detail below in connection with FIG. 9, in one embodiment the timer used by the pause generation process is slightly shorter than the quanta value specified in the flow control message. This enables the pause generation process to assess the fullness level of the shared packet buffer to reassert flow control if the fullness level of the buffer has not improved sufficiently.

The data plane further includes a Network Processing Unit (NPU) 26 and a switch fabric 29. The NPU and switch fabric enable data to be switched between ports to allow the network element to forward network traffic toward its destination on the network. The NPU may support a buffer management process 30 and processes designed to facilitate forwarding of packets through the network, such as forwarding information base 32.

In one embodiment, where flow control is to be implemented on a per-port basis, each port is assigned a three-color meter. Where flow control is to be implemented on a per-flow per-port basis, each flow is assigned a three-color meter. Although a two color meter would work, in the embodiment described below an implementation using a three color meter has been assumed. Buffer management may be implemented on a per-port basis or a per-flow-per-port basis depending on the implementation. To facilitate understanding, an embodiment in which buffer management is implemented on a per-port basis will be described. This may be extended to a per-flow per-port basis by individually metering flows and individually asserting flow control within flows by transmitting pause messages specific to particular flows rather than generic to all traffic associated with a given port.

Packets may be metered based on four values: Committed Information Rate (CIR); Peak Information Rate; Committed Burst Size (CBS); and Peak Burst Size (PBS). CIR is typically set to 50% of the port rate and PIR is typically set to 80% of the port rate, although other values may be used as well. The CBS and PBS are set based on available buffers in the pool. The minimum buffer requirements for optimum lossless behavior may be calculated as a multiplier times the sum of the CBS of each of the ports and the sum of the PBS of each of the ports. In addition, the minimum buffer must be sized to accommodate the headroom requirements of the switch. In one embodiment, the minimum buffer may be calculated as:

$$\text{Min\_Buffer} >= \alpha*(\Sigma CBSp + \Sigma PBSp) + h, \text{ where}$$

$\alpha >= 2$, note values $\alpha < 2$ may be used but optimal bandwidth throughput may not be achieved.

subscript p is for each port, and h is headroom:

The headroom may be calculated as:

$$h = 2*MPS*NP*TD*BPS,$$

where MPS is Max Packet Size in bytes, NP is Number of Ports, TD is Transport Delay, and BPS is Bytes Per Second per port. Headroom enables packets in-transit to the switch to be stored in the buffer and not dropped to accommodate packets that have previously been transmitted or will be transmitted by an upstream switch prior to receipt of the pause message by the upstream switch.

FIGS. 3A, 4A, and 5A show packet buffer 14 at various fullness levels, and corresponding FIGS. 3B, 4B, and 5B show how operation of an example flow control process may vary depending on the fullness level of the packet buffer. As shown in FIG. 3A, according to an embodiment the buffer pool is segmented into three regions: unrestricted 34, enforced 36, and headroom 38. The fullness level is represented by shaded region 40. As shown in FIGS. 3A and 3B, if the buffer fullness level is in the unrestricted region, any packet that is received (300) will be stored in the buffer (302) and no pause messages are generated (304). The input port on which the packet is received and the packet color are not taken into consideration while the buffer is in the unrestricted region so that any input port may provide packets to the buffer in this state regardless of the number of packets received and regardless of the color marking of the packet.

FIGS. 4A and 4B show how a packet is handled if the buffer fullness level is in the headroom region 38. Specifically, as shown in FIG. 4B, when a packet is received from a lossless ingress port (400) while the buffer pool usage is within the headroom region, the packet is stored in the buffer (402) and a pause message is sent to the upstream node over the ingress port (404).

FIGS. 5A and 5B show how a packet is handled if the buffer fullness level is in the enforced region 36. Specifically, as shown in FIG. 5B, when a packet is received from a lossless ingress port (500) while the buffer pool usage is within the enforced region, the packet will be stored in the buffer (502) and a statistical pause generation process will be used (504) to selectively generate pause messages. In one embodiment, if the fullness level of the buffer is in the enforced region, a random number will be generated (506) and compared with a probability curve (508). The probability curve may specify different values keyed to the fullness levels of the buffer. Likewise, the probability curve may be color dependent, in that different probability curves may be used for each of the color meters to adjust the likelihood of a pause message being generated depending on the color of the packet that was received at the port. By comparing the random number with the probability curve, the statistical pause generation process probabilistically generates pause messages for ports that share the buffer (510).

Many different ways of implementing probability curves that return a fullness based value for use in the statistical pause generation process may be utilized. For example, a table having values associated with discretized fullness levels of the buffer pool may be used or a function having, as an input, the fullness level of the buffer pool may be used. The fullness level may count the number of pages of memory used and may be based on the entire count or may be based on the several most significant bits of the fullness counter depending on the embodiment. FIGS. 6A-B, 7A-B, and 8A-B are intended to conceptually illustrate how the comparison of a random number with a number based on a colored probability curve may be used to statistically generate pause generation messages. The particular manner in which this is implemented, e.g. the particular data structures used to implement this concept and the function/curve/discrete steps used to determine these values, will depend entirely on the implementation. Likewise the particular shape of the function used may be selected according to desired pause generation characteristics for the particular network element and network in which the statistical pause generation process is to be utilized.

FIGS. 6A-6C graphically show how comparison of a randomly generated number with probability curves enables statistical generation of pause messages according to an embodiment, when the shared buffer pool is in the enforced region. As shown in FIGS. 6A-6C, in one embodiment the packet color causes one of the three probability curves to be selected—namely, green, yellow and red curves. The Enforced region is further subdivided into incremental levels which track the buffer utilization in a more granular fashion in this region. The probability curves may be piecewise linear or continuous, depending on the embodiment. The occupancy level is then used to index into the selected curve table and the corresponding probability value is returned. The probability value is then compared to a random number. The comparison result dictates whether a pause message is sent out to the associated port.

In the example shown in FIG. 6A, a packet is received at a port and marked GREEN (600). Because the buffer pool is in the enforced region, a statistical pause generation process will be implemented. In connection with this, a random number A is generated for the packet, and a value G of a green probability curve 70 at the buffer fullness level is compared with the random number A (602). In the illustrated example, the buffer fullness level is at 50% and the number obtained from the GREEN probabilty curve 70 is G. If the number obtained from the GREEN probabilty curve G is greater than the random number A (FIG. 6A), then a pause message will be generated and transmitted from the port (604). If the number obtained from the GREEN probabilty curve G is less than the random number A (FIG. 6B), then a pause message will NOT be generated and transmitted from the port (606).

As visualized in FIG. 6A, a higher buffer fullness level will cause the number obtained from the GREEN probabilty curve G to increase, thus decreasing the chance that the random number A will be higher. This, in turn, increases the likelihood that a pause message will be generated with increasing fullness level of the buffer pool. The converse is equally true—as the buffer pool fullness level decreases, the value G returned from the GREEN probability curve will decrease. A decreasing probability curve value will increase the likelihood that the randomly generated value will be larger, thus decreasing the chance of generation of a pause message.

FIGS. 6A and 6B show the YELLOW 72 and RED 74 probability curves in dashed lines to show the comparison between the three probability curves. As shown in FIGS. 6A and 6B, the YELLOW and RED probability curves may be crafted to increase the likelihood of a pause message being generated for a given fullness level depending on the color of the packet. Specifically, by causing relatively larger values to be returned from the probability curves for different classes of packets, it is possible to increase the likelihood that a pause message will be generated for a YELLOW packet than for a GREEN packet, given the same buffer fullness level. Likewise since the RED curve has higher values overall than the YELLOW or GREEN curves, a RED packet is more likely to cause a pause message to be generated than a YELLOW packet.

Figure 7A:
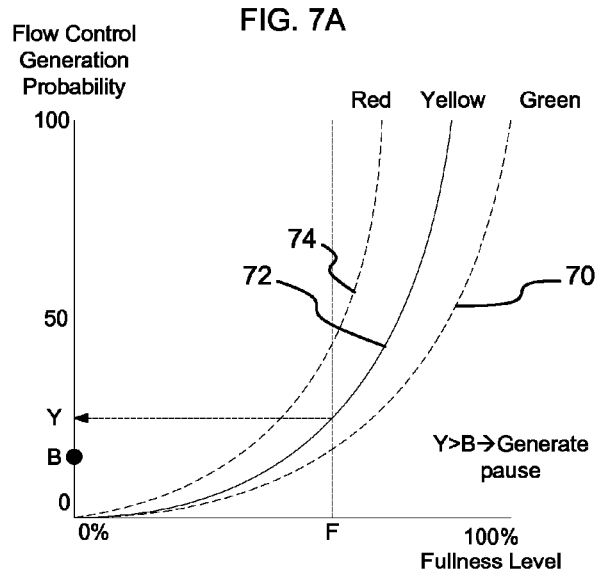
Figure 7B:
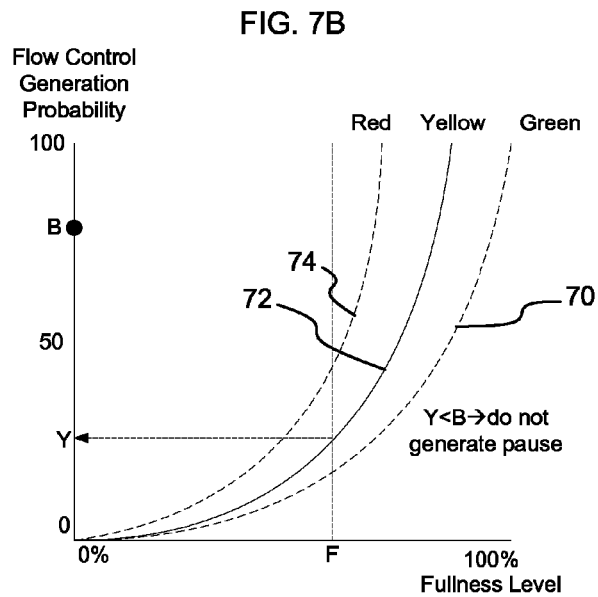
Figure 7C:
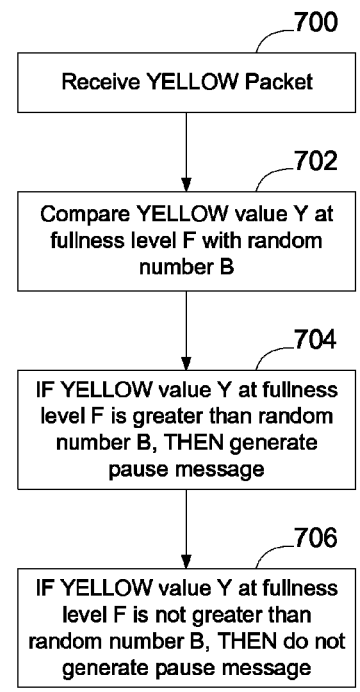

FIGS. 7A-7C show pause message generation upon receipt of a YELLOW packet. As shown in FIGS. 7A-7C, a packet is received at a port and marked YELLOW (700). A random number B is generated for the packet, and a value Y of a YELLOW probability curve 70 at the buffer fullness level F is compared with the random number B (702). In the illustrated example, the buffer fullness level is at 50% and the number obtained from the YELLOW probabilty curve 70 is Y. If the number obtained from the YELLOW probabilty curve Y is greater than the random number B (FIG. 7A), then a pause message will be generated and transmitted from the port (704). If the number obtained from the YELLOW probabilty curve Y is less than the random number B (FIG. 7B), then a pause message will NOT be generated and transmitted from the port (706).

Figure 8A:
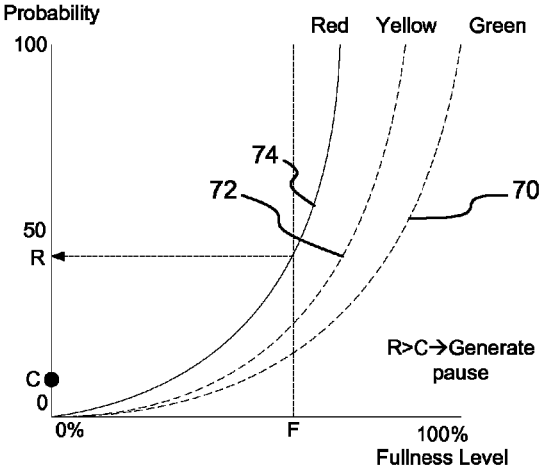
Figure 8B:
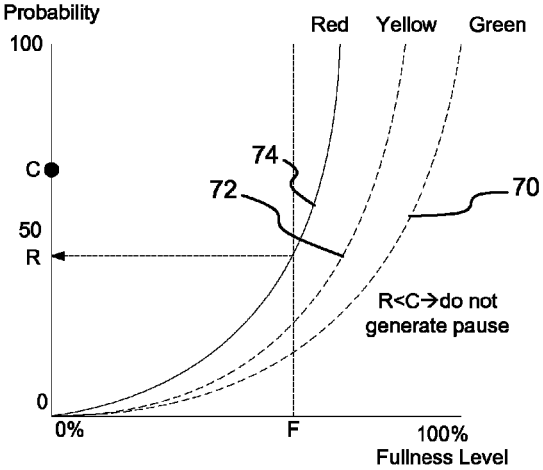
Figure 8C:
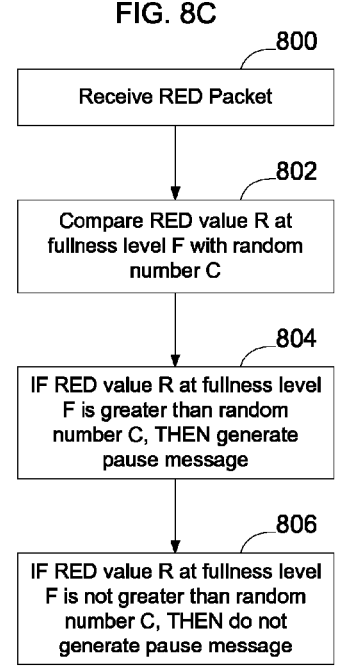

FIGS. 8A-8C show pause message generation upon receipt of a RED packet. As shown in FIGS. 8A-8C, a packet is received at a port and marked RED (700). A random number C is generated for the packet, and a value R of a RED probability curve 70 at the buffer fullness level F is compared with the random number C (702). In the illustrated example, the buffer fullness level is at 50% and the number obtained from the RED probabilty curve 70 is R. If the number obtained from the RED probabilty curve R is greater than the random number C (FIG. 8A), then a pause message will be generated and transmitted from the port (704). If the number obtained from the RED probabilty curve R is less than the random number C (FIG. 8B), then a pause message will NOT be generated and transmitted from the port (706).

In the illustrated examples the probability curves are shown as continuous curves. The probability functions may be implemented as table driven functions or non-table driven functions depending on the embodiment. Many different probability curves may be utilized and the invention is not limited to use with these particular probability curves. By adjusting the shape of the probability curves, the pause message generation behaviour may be adjusted. Although an example was illustrated in which the probability curves appeared continuous, discrete values may be used as well and assigned to particular regions. Likewise, although an example was provided in which a particular comparison was used to determine whether a pause message should be generated, other comparisons may be used as well. For example, the curves could be adjusted such that a random value larger than the statistical value would cause generation of a pause message. Thus, the illustrated example is one way of implementing a statistical pause generation process.

Although an example has been described in which pause generation is implemented to enable per-port lossless packet transmission, this may optionally be extended to provide for per-flow per-port lossless transmission of packets. Extention, in this manner, requires an increase in the number of meters used to classify packets (one set of packet meters per flow instead of one set of packet meters per port). Additionally, although an embodiment has been described in which one set of probability curves is used for each class of packets, optionally separate probability curves may be used for different ports or different packet flows, to further individually optimize the manner in which traffic is handled by the network element.

Figure 9:
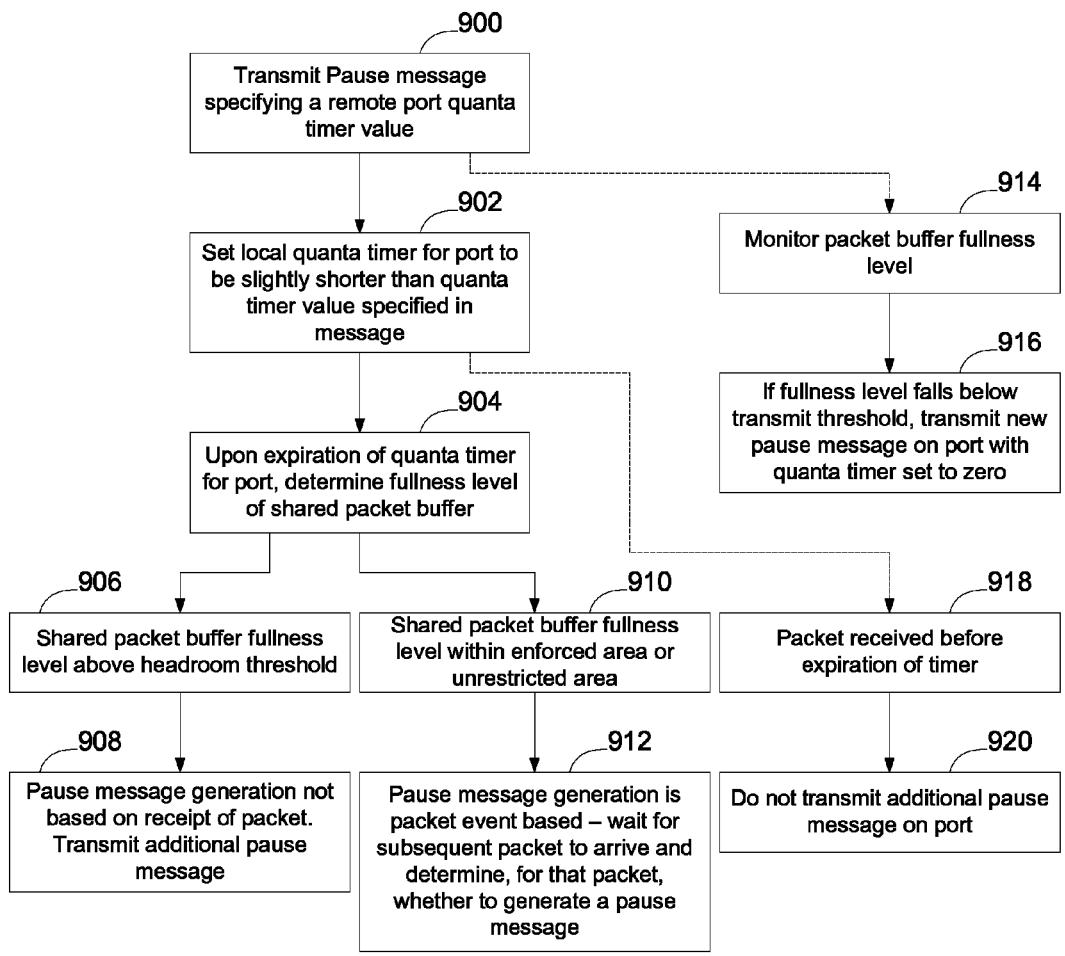
FIG. 9 is a flow diagram of a process used to control timers for regeneration of pause messages based on a fullness level of the shared packet buffer.

FIG. 9 shows a process that may be implemented once a pause message has been generated and transmitted. Specifically, when the network element transmits a pause message (900), the pause message will include a remote port quanta timer value specifying a duration during which the remote port should refrain from transmitting additional packets.

The pause generation process will also set a local quanta timer for the port to be slightly shorter than the remote port quanta timer value specified in the message (902). Upon expiration of the local quanta timer for the port, the pause generation process will determine a fullness level of the shared packet buffer (904). If the fullness level of the shared packet buffer is in the headroom area (906) the pause generation process will not be based on arrival of a packet, and the process will transmit an additional pause message (908) to continue to prevent the remote port from transmitting additional packets.

If the shared packet buffer fullness level is within the enforced area or unrestricted area (910), assertion of flow control will be a packet based event (912). Specifically, the process will wait for a subsequent packet to arrive and determine, for that packet, whether to generate a pause message. The process described above in connection with FIGS. 3B, 4B, and 5B are used, in one embodiment, to implement the packet-based flow control message generation process.

If a packet is received on a port and a pause generation message has previously been sent on that port (918), in one embodiment, a second pause generation message will not be transmitted on the port until after expiration of the quanta timer associated with the port (920). Upon expiration of the timer, re-transmission of a subsequent pause message will either be a non-packet based event (when buffer is in the headroom region) or a packet based event (if the buffer is not in the headroom region) as described above.

There are instances where the buffer may be cleared quickly. Accordingly, in one embodiment, the fullness level of the packet buffer is monitored (914). In this embodiment, if the shared buffer fullness level falls below a transmit threshold, a second pause message will be generated and sent on one or more ports where local quanta timers have not yet expired (916). In this embodiment, the second pause messages will include a quanta timer value set to zero or another low value. Each time the upstream node receives a pause message, it resets its quanta timer to the value specified in the pause message. By setting the pause message to zero or another very low number, the upstream node will resume transmission without waiting until the expiration of the original quanta timer set in the previous pause message. This may help prevent underflow of the shared buffer pool to help prevent the output from the network element from being adversely affected by the pause generation process in use at the network element.

The functions described herein may be embodied as a software program implemented in control logic on a processor on the network element or may be configured as a FPGA or other processing unit on the network element. The control logic in this embodiment may be implemented as a set of program instructions that are stored in a computer readable memory within the network element and executed on a microprocessor on the network element. However, in this embodiment as with the previous embodiments, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, or any other device including any combination thereof. Programmable logic can be fixed temporarily or permanently in a tangible non-transitory computer-readable medium such as a random access memory, cache memory, read-only memory chip, a computer memory, a disk, or other storage medium. All such embodiments are intended to fall within the scope of the present invention.

It should be understood that various changes and modifications of the embodiments shown in the drawings and described herein may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of managing a shared buffer pool of memory to implement lossless packet forwarding at a network element, the shared buffer pool of memory being shared between a plurality of ports on the network element, the method comprising:
   receiving a packet on a first of the ports of the network element;
   coloring the packet as in-profile or out-of-profile;
   determining a fullness level of the shared buffer pool of memory;
   storing the packet in the shared buffer pool regardless of the fullness level of the shared buffer pool and regardless of the color of the packet;
   transmitting a flow control message on the first of the ports if the fullness level of the shared buffer pool is above a first threshold;
   not transmitting the flow control message on the first of the ports if the fullness level of the shared buffer pool is below a second threshold; and
   using a statistical process to determine whether the flow control message should be transmitted on the first of the ports if the fullness level of the shared buffer pool is above the second threshold and below the first threshold;
   wherein a single threshold is used for the first threshold regardless of the color of the packet, and wherein a single threshold is used for the second threshold regardless of the color of the packet, and wherein separate probability curves are used in the statistical process for packets that are colored in-profile and packets that are colored out-of-profile in connection with determining whether the flow control message should be transmitted when the fullness level of the shared buffer pool is above the second threshold and below the first threshold.

2. The method of claim 1, wherein the step of coloring the packet is implemented using a three color packet meter.

3. The method of claim 1, wherein the first threshold is a headroom threshold set to enable the shared buffer pool of memory to accommodate packets in transit to the network element when the flow control message is sent.

4. The method of claim 1, wherein all ports share the shared buffer pool of memory without having allocated pages of memory specified for each of the ports.

5. The method of claim 1, wherein the amount of shared buffer pool of memory used by any one of the ports is not tracked in the network element.

6. The method of claim 1, wherein the statistical process comprises the steps of generating a random number, obtaining a probability value based on the fullness level of the shared buffer pool of memory; and comparing the random number with the probability value.

7. The method of claim 6, wherein the probability value is based on the probability curves and is different for a given fullness level depending on whether the packet is colored as in profile or out of profile.

8. The method of claim 1, wherein the step of coloring the packet is implemented using a three color packet meter; and wherein the statistical process comprises the steps of generating a random number, obtaining a probability value based on the fullness level of the shared buffer pool of memory and the color of the packet from the probability curves; and comparing the random number with the probability value.

9. The method of claim 8, wherein a green probability curve is used to obtain the probability value for green colored packets; wherein a yellow probability curve is used to obtain the probability value for yellow colored packets; and wherein a red probability curve is used to obtain the probability value for red colored packets.

10. The method of claim 1, further comprising monitoring the fullness level of the shared buffer pool after transmission of the flow control message on the first of the ports to prevent underflow of the shared buffer pool.

11. The method of claim 10, further comprising the step of transmitting a subsequent flow control message having a small quanta timer value on the first of the ports, prior to expiration of a local port quanta timer, if the fullness level of the shared buffer falls below a third threshold.

12. The method of claim 11, wherein the small quanta timer value is zero seconds.

13. A method of managing a shared buffer pool of memory to implement lossless packet forwarding at a network element, the shared buffer pool of memory being shared between a plurality of ports on the network element, the method comprising:
   receiving a packet on a first of the ports of the network element;
   determining a fullness level of the shared buffer pool of memory;
   storing the packet in the shared buffer pool regardless of the fullness level of the shared buffer pool;
   transmitting a flow control message on the first of the ports if the fullness level of the shared buffer pool is above a first threshold;
   not transmitting the flow control message on the first of the ports if the fullness level of the shared buffer pool is below a second threshold;
   coloring the packet using a three color packet meter; and
   using a statistical process to determine whether the flow control message should be transmitted on the first of the ports if the fullness level of the shared buffer pool is above the second threshold and below the first threshold, the statistical process comprising the steps of generating a random number, obtaining a probability value based on the fullness level of the shared buffer pool of memory and the color of the packet; and comparing the random number with the probability value;
   wherein a green probability curve is used to obtain the probability value for green colored packets; wherein a yellow probability curve is used to obtain the probability value for yellow colored packets; and wherein a red probability curve is used to obtain the probability value for red colored packets;
   wherein at least one of the green probability curve, yellow probability curve, and red probability curve is a implemented as a table having values associated with discretized fullness levels of the buffer pool; and wherein a single threshold is used for the first threshold regardless of the color of the packet, and wherein a single threshold is used for the second threshold regardless of the color of the packet, and wherein separate probability curves are used in the statistical process for packets that are colored in-profile and packets that are colored out-of-profile in connection with determining whether the flow control message should be transmitted when the fullness level of the shared buffer pool is above the second threshold and below the first threshold.

14. The method of claim 13, wherein the fullness level of the buffer pool is determined by counting a number of pages of memory used by packets stored in the buffer pool.

15. The method of claim 13, wherein the fullness level of the buffer pool is determined by a count of a number of pages of memory used by packets stored in the buffer pool, and wherein the discretized fullness levels are based on a set of most significant bits of the count of the number of pages of memory used by packets stored in the buffer pool.

16. The method of claim 1, further comprising the steps of setting a remote port quanta value in the flow control message; setting a local port quanta timer to a value smaller than the remote port quanta value; and initiating the local port quanta timer upon transmission of the flow control message.

17. The method of claim 16, further comprising the step of automatically transmitting a subsequent flow control message on the first of the ports if the fullness level of the shared buffer pool is above the first threshold upon expiration of the local port quanta timer.

18. The method of claim 16, further comprising the step of waiting for a second packet prior to transmitting a subsequent flow control message on the first of the ports if the fullness level of the shared buffer pool is below the first threshold upon expiration of the local port quanta timer.

* * * * *